US012415532B2

(12) United States Patent
Fujiwara et al.

(10) Patent No.: US 12,415,532 B2
(45) Date of Patent: Sep. 16, 2025

(54) CONTROL DEVICE, CONTROL METHOD, AND COMPUTER-READABLE RECORDING MEDIUM

(71) Applicant: HONDA MOTOR CO., LTD., Tokyo (JP)

(72) Inventors: Tatsuro Fujiwara, Tokyo (JP); Hiroyuki Nakashima, Tokyo (JP); Akiko Sato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 199 days.

(21) Appl. No.: 18/113,687

(22) Filed: Feb. 24, 2023

(65) Prior Publication Data

US 2023/0286526 A1 Sep. 14, 2023

(30) Foreign Application Priority Data

Mar. 14, 2022 (JP) ................................ 2022-039042

(51) Int. Cl.

*B60W 50/14* (2020.01)
*B60W 30/06* (2006.01)
*G06V 20/58* (2022.01)

(52) U.S. Cl.

CPC ............ *B60W 50/14* (2013.01); *B60W 30/06* (2013.01); *G06V 20/58* (2022.01); *B60W 2050/146* (2013.01); *B60W 2420/403* (2013.01)

(58) Field of Classification Search

CPC ................. B60W 50/14; B60W 30/06; B60W 2050/146; B60W 2420/403;

(Continued)

(56) References Cited

U.S. PATENT DOCUMENTS

2007/0018974 A1 1/2007 Fujiwara et al.
2008/0198229 A1 8/2008 Hongo (Continued)

FOREIGN PATENT DOCUMENTS

CN 113759911 A * 12/2021 ........... G05D 1/0214
JP 2007-026200 A 2/2007

(Continued)

OTHER PUBLICATIONS

Machine translation of KR20210115493 (Year: 2021).*

(Continued)

*Primary Examiner* — Anne Marie Antonucci
*Assistant Examiner* — Patrick Daniel Mohl
(74) *Attorney, Agent, or Firm* — Paratus Law Group, PLLC

(57) ABSTRACT

A control device for a moving body includes circuitry configured to: acquire an external environment recognition image representing a recognition result of a periphery of the moving body; and cause a display device to display an obstacle icon indicating an obstacle position based on an input from a user of the moving body in a superimposed manner on the external environment recognition image. The circuitry is further configured to: cause the display device to display a first external environment recognition image and a second external environment recognition image having different viewpoints as the external environment recognition image; and superimpose a first obstacle icon on the first external environment recognition image and superimpose a second obstacle icon different from the first obstacle icon on the second external environment recognition image, as the obstacle icon.

9 Claims, 9 Drawing Sheets

(58) Field of Classification Search

CPC ............. B60W 2554/20; B60W 40/02; B60W 60/0011; B60W 2540/215; B60W 2552/50; G06V 20/58; G06V 20/586; B60K 2360/1438; B60K 2360/179; B60K 35/22; B62D 15/027; B62D 15/0285

See application file for complete search history.

(56) References Cited

U.S. PATENT DOCUMENTS

| | | | | |
|---|---|---|---|---|
| 2017/0158134 | A1* | 6/2017 | Shigemura | H04N 7/181 |
| 2018/0244287 | A1 | 8/2018 | Kirstein et al. | |
| 2018/0330175 | A1* | 11/2018 | Corcoran | G06V 10/147 |
| 2019/0027041 | A1* | 1/2019 | Watanabe | G06V 20/58 |
| 2020/0082185 | A1* | 3/2020 | Yamamoto | B60R 1/27 |
| 2020/0239073 | A1* | 7/2020 | Watanabe | B60Q 9/005 |
| 2020/0398826 | A1* | 12/2020 | Tsujino | B60W 50/14 |
| 2021/0233290 | A1* | 7/2021 | Shimazu | G06T 11/001 |
| 2022/0104675 | A1* | 4/2022 | Schneider | A47L 11/4011 |
| 2022/0298756 | A1* | 9/2022 | Eguchi | G06V 20/58 |
| 2022/0383645 | A1* | 12/2022 | Hayashi | G08G 1/166 |
| 2022/0405516 | A1* | 12/2022 | Hoisington | E01C 19/48 |
| 2023/0058508 | A1* | 2/2023 | Bush | B60W 60/005 |

FOREIGN PATENT DOCUMENTS

| | | | | |
|---|---|---|---|---|
| JP | 2008-205928 | A | | 9/2008 |
| JP | 2012-040883 | A | | 3/2012 |
| JP | 2014-137761 | A | | 7/2014 |
| JP | 2021-123277 | A | | 8/2021 |
| KR | 20210115493 | A | * | 9/2021 |
| WO | WO 2017/028849 | A1 | | 2/2017 |

OTHER PUBLICATIONS

Machine translation of CN113759911 (Year: 2021).*

Aug. 8, 2023, Translation of Japanese Office Action issued for related JP Application No. 2022-039042.

* cited by examiner

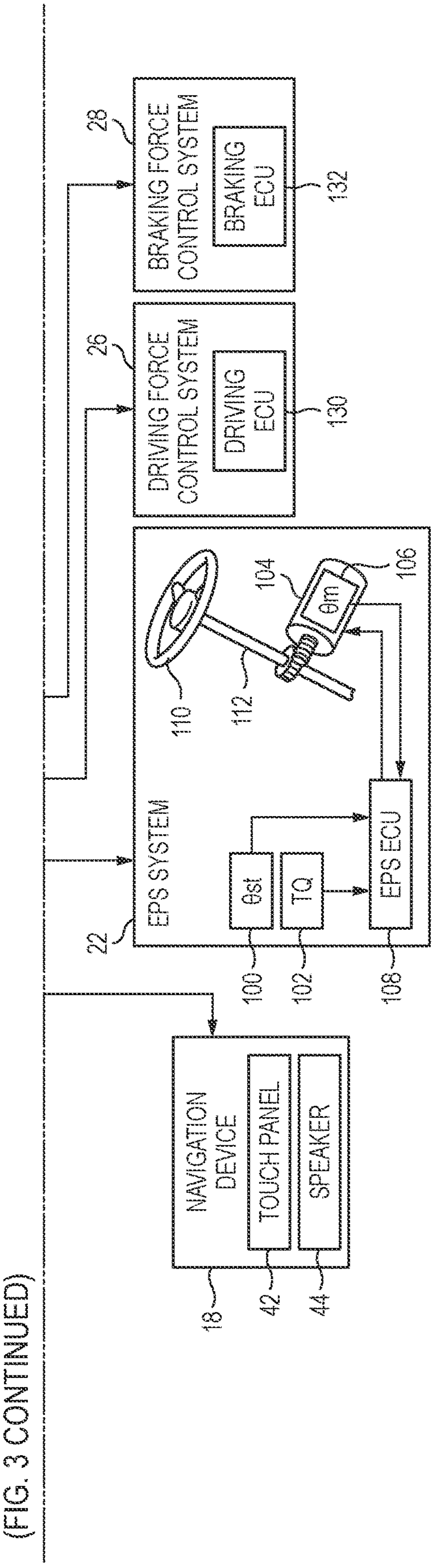
(FIG. 3 CONTINUED)

CONTROL DEVICE, CONTROL METHOD, AND COMPUTER-READABLE RECORDING MEDIUM

CROSS-REFERENCE TO RELATED APPLICATIONS

This application is based on and claims priority under 35 USC 119 from Japanese Patent Application No. 2022-039042 filed on Mar. 14, 2022, the contents of which are incorporated herein by reference.

TECHNICAL FIELD

The present disclosure relates to a control device, a control method, and a computer-readable recording medium.

BACKGROUND ART

In recent years, efforts have been actively made to provide access to sustainable transportation systems that are considerate of vulnerable people in transport participants. In order to realize the above object, attention is focused on research and development to further improve safety and convenience of traffic through research and development related to a driving assistance technology.

The related art discloses a known technique for displaying a state of an external environment of a vehicle on a display device as a multi-view image when the vehicle is automatically parked in a parking space. In addition, a technique is known for displaying an obstacle present in a periphery of a vehicle as a virtual icon in an external environment image of the vehicle when the external environment image of the vehicle is displayed on a display device. International Patent Publication No. WO2017/028849 pamphlet (hereinafter, referred to as Patent Literature 1) discloses that an obstacle can be added to and deleted from, by a manual input such as a tap operation or a slide operation of a user, an automatic parking trajectory determined in advance, and the automatic parking trajectory adjusted by a manual operation is determined to park a vehicle.

According to Patent Literature 1, when a user recognizes an obstacle that cannot be detected by a sensor or the like, it is possible to calculate an automatic parking trajectory in consideration of the obstacle that can be added by a manual operation input.

However, Patent Literature 1 does not describe display of an obstacle in a case where an image of an external environment of the vehicle is displayed as a multi-view image. Therefore, in the driving assistance technology, there is room for improvement in the related-art technique regarding a method of displaying an obstacle displayed in an external environment image of a vehicle.

The present disclosure provides a control device, a control method, and a computer-readable recording medium which enable to display an obstacle in a periphery of a vehicle according to a viewpoint of an external environment recognition image of the vehicle. Further, the present disclosure contributes to development of sustainable transportation systems.

SUMMARY

A first aspect of the present disclosure relates to a control device for a moving body, the control device including circuitry configured to:

- acquire an external environment recognition image representing a recognition result of a periphery of the moving body; and
- cause a display device to display an obstacle icon indicating an obstacle position based on an input from a user of the moving body in a superimposed manner on the external environment recognition image, in which the circuitry is configured to:

- cause the display device to display a first external environment recognition image and a second external environment recognition image having different viewpoints as the external environment recognition image; and
- superimpose a first obstacle icon on the first external environment recognition image and superimpose a second obstacle icon different from the first obstacle icon on the second external environment recognition image, as the obstacle icon.

A second aspect of the present disclosure relates to a control method executed by a control device for a moving body, the control method including:

- acquiring an external environment recognition image representing a recognition result of a periphery of the moving body;
- causing a display device to display an obstacle icon indicating an obstacle position based on an input from a user of the moving body in a superimposed manner on the external environment recognition image;
- causing the display device to display a first external environment recognition image and a second external environment recognition image having different viewpoints as the external environment recognition image; and
- superimposing a first obstacle icon on the first external environment recognition image and superimposing a second obstacle icon different from the first obstacle icon on the second external environment recognition image as the obstacle icon.

A third aspect of the present disclosure relates to a non-transitory computer-readable recording medium storing a control program for causing a processor of a control device for a moving body to execute processing, the processing including:

- acquiring an external environment recognition image representing a recognition result of a periphery of the moving body,
- causing a display device to display an obstacle icon indicating an obstacle position based on an input from a user of the moving body in a superimposed manner on the external environment recognition image,
- causing the display device to display a first external environment recognition image and a second external environment recognition image having different viewpoints as the external environment recognition image, and
- superimposing a first obstacle icon on the first external environment recognition image and superimposing a second obstacle icon different from the first obstacle icon on the second external environment recognition image as the obstacle icon.

According to the present disclosure, it is possible to provide a control device, a control method, and a computer-readable recording medium which enable to display an obstacle in a periphery of a vehicle according to a viewpoint of an external environment recognition image of the vehicle.

BRIEF DESCRIPTION OF DRAWINGS

Exemplary embodiment(s) of the present invention will be described in detail based on the following figures, wherein.

DESCRIPTION OF EMBODIMENTS

Figure 1:
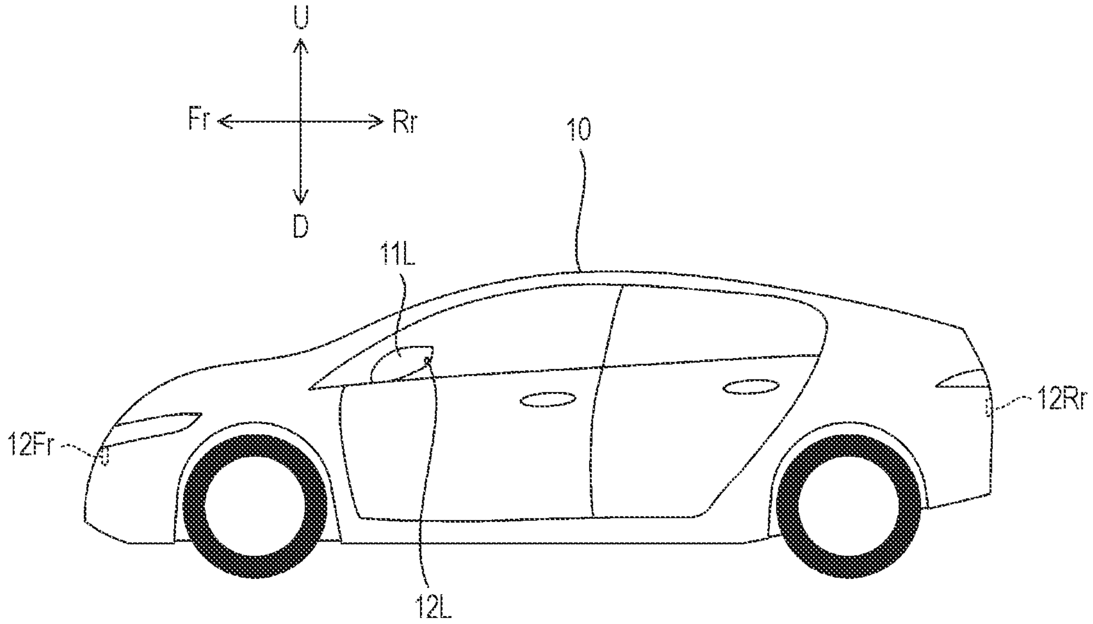
FIG. 1 is a side view showing an example of a vehicle on which a control device according to an embodiment is mounted.

Hereinafter, an embodiment of a control device, a control method, and a computer-readable recording medium according to the present disclosure will be described with reference to the accompanying drawings. The drawings are viewed in directions of reference numerals. In addition, in the present specification and the like, in order to simplify and clarify the description, a front-rear direction, a left-right direction, and an upper-lower direction are described according to directions viewed from a driver of a vehicle 10 shown in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

<Vehicle 10 on which Control Device of Present Disclosure is Mounted>

Figure 2:
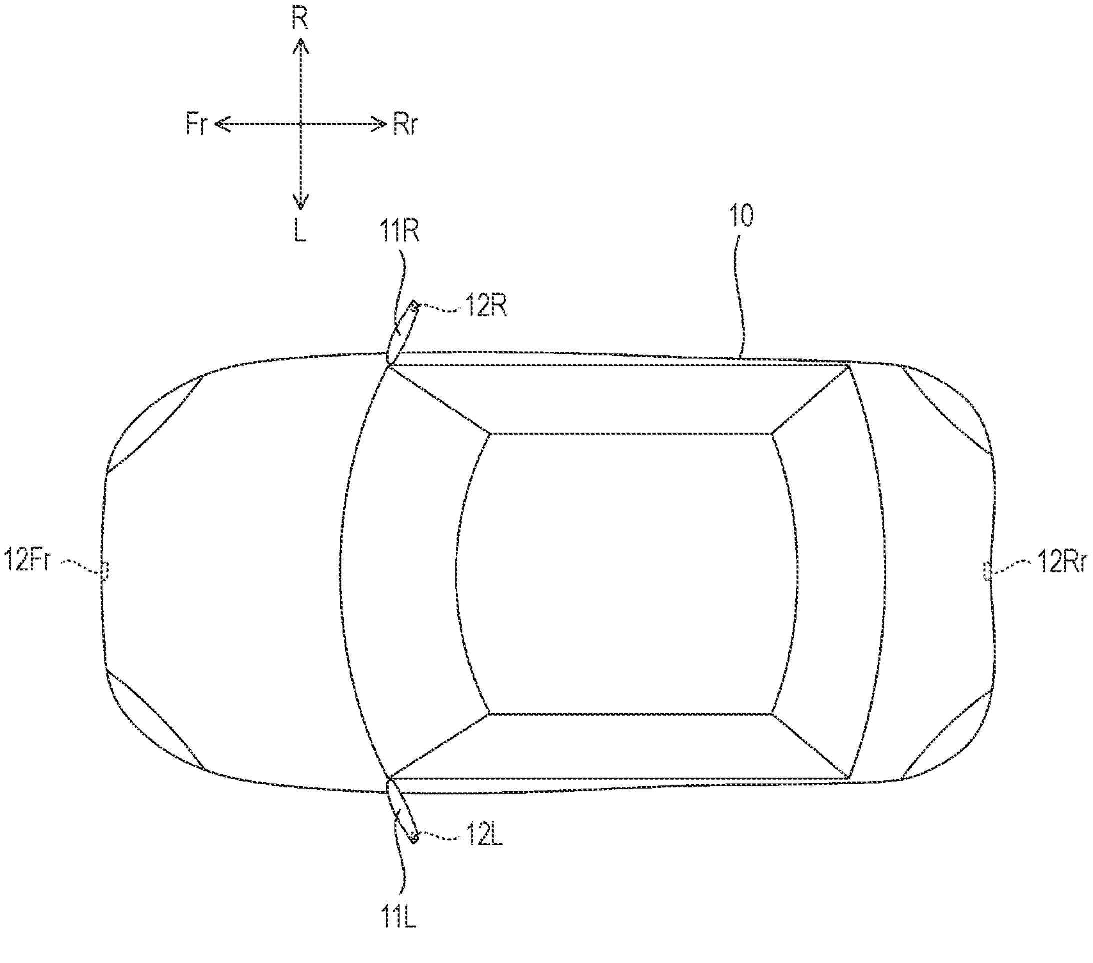
FIG. 2 is a top view of the vehicle shown in FIG. 1.

FIG. 1 is a side view of the vehicle 10 on which a control device according to the present disclosure is mounted. FIG. 2 is a top view of the vehicle 10 shown in FIG. 1. The vehicle 10 is an example of a moving body in the present disclosure.

The vehicle 10 is an automobile including a drive source (not shown) and wheels including driving wheels driven by power of the drive source and steering wheels that are steerable. In the present embodiment, the vehicle 10 is a four-wheeled automobile including a pair of left and right front wheels and a pair of left and right rear wheels. The drive source of the vehicle 10 is, for example, an electric motor. The drive source of the vehicle 10 may be an internal combustion engine such as a gasoline engine or a diesel engine, or a combination of an electric motor and an internal combustion engine. In addition, the drive source of the vehicle 10 may drive the pair of left and right front wheels, the pair of left and right rear wheels, or four wheels, that is, the pair of left and right front wheels and the pair of left and right rear wheels. The front wheels and the rear wheels may both be steering wheels that are steerable, or the front wheels or the rear wheels may be steering wheels that are steerable.

The vehicle 10 further includes side mirrors 11L and 11R. The side mirrors 11L and 11R are mirrors (rearview mirrors) that are provided at outer sides of front seat doors of the vehicle 10 and that allow the driver to check a rear side and rear lateral sides. Each of the side mirrors 11L and 11R is fixed to a body of the vehicle 10 by a rotation shaft extending in a vertical direction and can be opened and closed by rotating about the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and captures an image of a front side with respect to the vehicle 10. The rear camera 12Rr is a digital camera that is provided at a rear portion of the vehicle 10 and captures an image of a rear side with respect to the vehicle 10. The left side camera 12L is a digital camera that is provided on the left side mirror 11L of the vehicle 10 and captures an image of a left side with respect to the vehicle 10. The right side camera 12R is a digital camera that is provided on the right side mirror 11R of the vehicle 10 and captures an image of a right side with respect to the vehicle 10.

<Internal Configuration of Vehicle 10>

Figure 3:
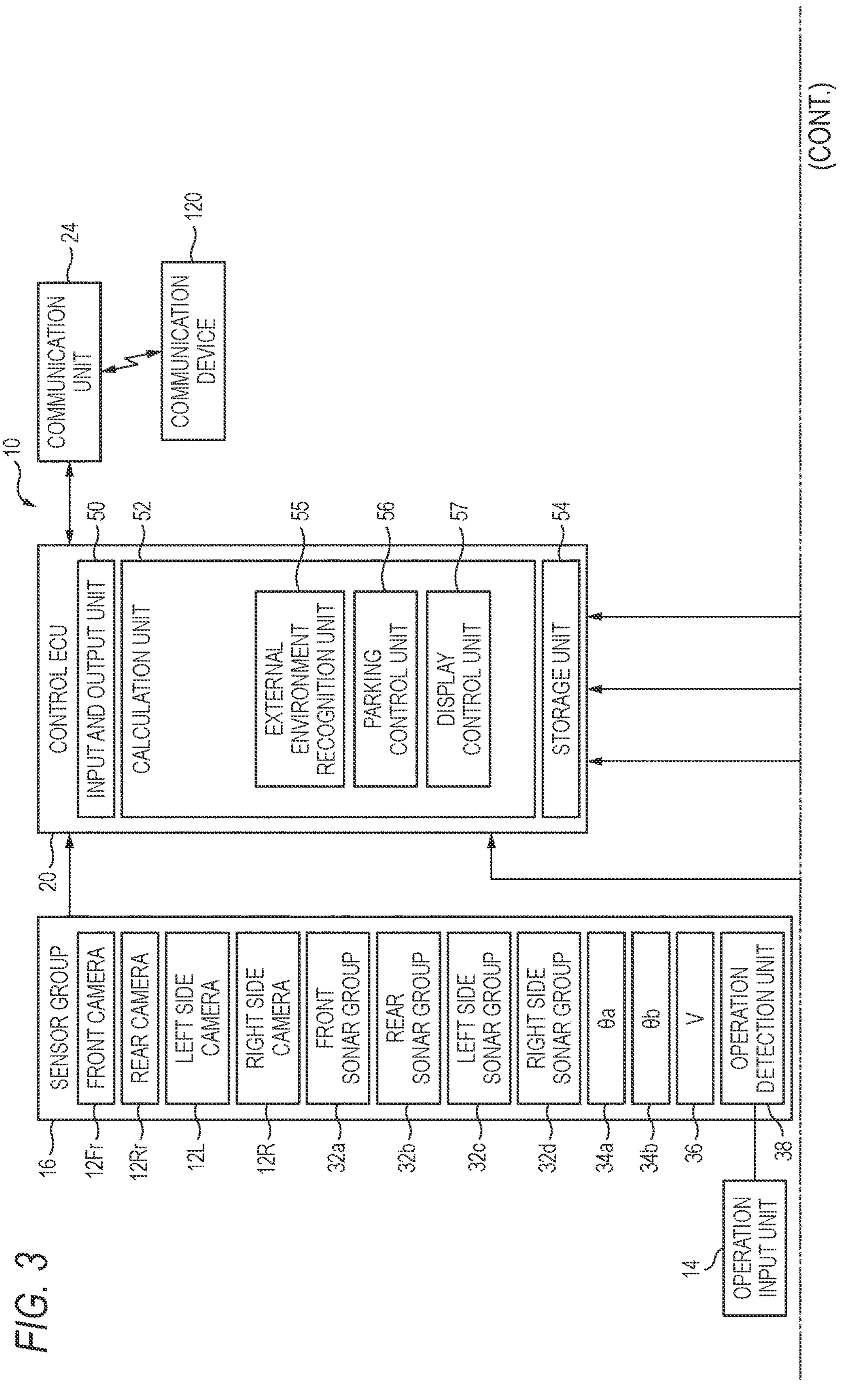
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detection values used for control performed by the control ECU 20. The sensor group 16 includes the front camera 12Fr, the rear camera 12Rr, the left side camera 12L, and the right side camera 12R. The sensor group 16 includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38. The sensor group 16 may include a radar.

The front camera 12Fr, the rear camera 12Rr, the left side camera 12L, and the right side camera 12R acquire recognition data (for example, an external environment recognition image) for recognizing a periphery of the vehicle 10 by capturing images of the periphery of the vehicle 10. Peripheral images captured by the front camera 12Fr, the rear camera 2Rr, the left side camera 12L, and the right side camera 12R are referred to as a front image, a rear image, a left side image, and a right side image, respectively. An image formed by the left side image and the right side image may be referred to as a side image. The external environment recognition image generated by synthesizing respective pieces of imaging data of the front camera 12Fr, the rear camera 12Rr, the left side camera 12L, and the right side camera 12R may be referred to as a top view image of the vehicle 10.

The front sonar group 32*a*, the rear sonar group 32*b*, the left side sonar group 32*c*, and the right side sonar group 32*d* emit sound waves to the periphery of the vehicle 10 and receive reflected sounds from other objects. The front sonar group 32*a* includes, for example, four sonars. The sonars constituting the front sonar group 32*a* are provided on an obliquely left front side, a front left side, a front right side, and an obliquely right front side of the vehicle 10, respectively. The rear sonar group 32*b* includes, for example, four sonars. The sonars constituting the rear sonar group 32*b* are provided on an obliquely left rear side, a rear left side, a rear right side, and an obliquely right rear side of the vehicle 10, respectively. The left side sonar group 32*c* includes, for example, two sonars. The sonars constituting the left side sonar group 32*c* are provided on a front side and a rear side of a left side portion of the vehicle 10, respectively. The right side sonar group 32*d* includes, for example, two sonars. The sonars constituting the right side sonar group 32*d* are provided on a front side and a rear side of a right side portion of the vehicle 10, respectively.

The wheel sensors 34*a* and 34*b* detect a rotation angle of the wheel of the vehicle 10. The wheel sensors 34*a* and 34*b* may be implemented by angle sensors or displacement sensors. The wheel sensors 34*a* and 34*b* output detection pulses each time the wheel rotates by a predetermined angle. The detection pulses output from the wheel sensors 34*a* and 34*b* are used to calculate the rotation angle of the wheel and a rotation speed of the wheel. A movement distance of the vehicle 10 is calculated based on the rotation angle of the wheel. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V. and outputs the detected vehicle speed V to the control ECU 20. The vehicle speed sensor 36 detects the vehicle speed V based on, for example, rotation of a countershaft of a transmission.

The operation detection unit 38 detects a content of an operation performed by a user using an operation input unit 14 and outputs the detected content of the operation to the control ECU 20. The operation input unit 14 includes, for example, various user interfaces such as a side mirror switch for switching between an opened state and a closed state of the side mirrors 11L and 11R, and a shift lever (a select lever or a selector).

The navigation device 18 detects a current position of the vehicle 10 by using, for example, a global positioning system (GPS), and guides the user to a path to a destination. The navigation device 18 includes a storage device (not shown) that includes a map information database.

The navigation device 18 includes a touch panel 42 and a speaker 44. The touch panel 42 functions as an input device and a display device of the control ECU 20. The speaker 44 outputs various types of guidance information to an occupant of the vehicle 10 by voice.

The touch panel 42 is configured to input various commands to the control ECU 20. For example, the user can input a command related to parking assistance of the vehicle 10 via the touch panel 42. The touch panel 42 is configured to display various screens related to a control content of the control ECU 20. For example, a screen related to the parking assistance of the vehicle 10 is displayed on the touch panel 42. Specifically, the touch panel 42 displays a parking assistance button for requesting the parking assistance of the vehicle 10. The parking assistance button includes an automatic parking button for requesting parking by automatic steering of the control ECU 20 and a parking guidance button for requesting guidance when parking by an operation of the driver. The touch panel 42 displays the external environment recognition image for recognizing the periphery of the vehicle 10. Constituent elements other than the touch panel 42, for example, a head-up display (HUD), a smartphone, or a tablet terminal may be used as the input device or the display device.

The "parking" is synonymous with, for example. "parking the moving body". For example, the "parking" is a stop accompanied by getting on and off of an occupant, and excludes a temporary stop due to a traffic signal or the like. The "parking position" is a position at which the moving body is stopped, that is, a position for parking.

The control ECU 20 includes an input and output unit 50, a calculation unit 52, and a storage unit 54. The calculation unit 52 is implemented by, for example, a central processing unit (CPU). The calculation unit 52 performs various types of control by controlling units based on a program stored in the storage unit 54. Further, the calculation unit 52 inputs and outputs a signal from and to units connected to the control ECU 20 via the input and output unit 50.

The calculation unit 52 includes an external environment recognition unit 55 for recognizing the external environment recognition image, a parking control unit 56 for controlling automatic parking of the vehicle 10, and a display control unit 57 for performing display control of the external environment recognition image. The calculation unit 52 is an example of the control device according to the present disclosure.

The external environment recognition unit 55 acquires, from the cameras, the external environment recognition image representing a recognition result of the periphery of the vehicle 10 captured by the front camera 12Fr, the rear camera 12Rr, the left side camera 12L, and the right side camera 12R.

The parking control unit 56 performs the parking assistance of the vehicle 10 by automatic steering in which a steering 110 is automatically operated under control of the parking control unit 56. In the assistance of the automatic steering, an accelerator pedal (not shown), a brake pedal (not shown), and the operation input unit 14 are automatically operated. The parking control unit 56 performs guide assistance when the driver manually parks the vehicle 10 by operating the accelerator pedal, the brake pedal, and the operation input unit 14.

For example, based on recognition data of an external environment of the vehicle 10 acquired by the front camera 12Fr, the rear camera 12Rr, the left side camera 12L, and the right side camera 12R, a predetermined parking position (hereinafter, also referred to as a "target parking position") designated by the user, and a position of an object (hereinafter, also referred to as an "obstacle position") that is present in a periphery of the target parking position and that is designated as an obstacle by the user, the parking control unit 56 controls automatic parking for parking the vehicle 10 at the target parking position.

The object designated as an obstacle by the user is an object that does not actually become an obstacle for the automatic parking, that is, an object that is not detected as an obstacle by the parking control unit 56 but that the user desires to include as an obstacle. The object that the user desires to include as an obstacle is, for example, an object that the vehicle 10 is not desired to pass at the time of the automatic parking. Specifically, the object that the vehicle 10 is not desired to pass is a "puddle", "dust", a "native-grown plant", or the like that is present on a movement path of the automatic parking of the vehicle 10. Further, the obstacle designated by the user may include, for example, an area that is set around a place where a child is present and that has a radius R2 larger than a range of a radius R1 actually determined not to be an obstacle for the automatic parking ($R1<R2$).

The parking control unit 56 receives the obstacle position designated by the user. The obstacle position is designated by, for example, an input operation of the user on the touch panel 42. The parking control unit 56 registers the target parking position and the obstacle position designated with respect to the target parking position in the storage unit 54 in association with each other.

The parking control unit 56 notifies the user of candidates for the obstacle position at the target parking position, and receives designation of the obstacle position selected by the user from the candidates for the obstacle position. The candidates for the obstacle position at the target parking position refer to candidates for a position of an object that may be expected to become an obstacle at the target parking position, that is, a position of an obstacle that is uniquely determined based on the target parking position. The parking control unit 56 displays and notifies the user of a candidate for the obstacle position selected by the user and a candidate for the obstacle position not selected by the user in the candidates for the obstacle position in different modes (for example, different colors or different transparency levels).

The display control unit 57 generates the external environment recognition image of the vehicle 10 based on the imaging data acquired by the cameras of the vehicle 10. Specifically, the display control unit 57 generates a synthesized image by synthesizing the respective pieces of imaging data acquired by the front camera 12Fr, the rear camera 12Rr, the left side camera 12L, and the right side camera 12R, and generates a top view image of the vehicle 10 and the periphery of the vehicle 10 showing a state in which the synthesized image is viewed from above. The top view image is an example of a first external environment recognition image in the present disclosure.

The display control unit 57 performs image processing of three-dimensionally reconstructing the synthesized image of the respective pieces of imaging data acquired by the front camera 12Fr, the rear camera 12Rr, the left side camera 12L, and the right side camera 12R, and generates a three-dimensional image virtually showing a state in which the vehicle 10 and the periphery of the vehicle 10 are rotated and viewed from, for example, a side or an obliquely upper side. The three-dimensional image is an example of a second external environment recognition image in the present disclosure. The first external environment recognition image and the second external environment recognition image are external environment recognition images having different viewpoints.

The display control unit 57 displays the generated external environment recognition image on the display device of the vehicle 10. Specifically, the display control unit 57 causes the touch panel 42 to display the top view image and the three-dimensional image of the vehicle 10 generated by synthesizing the respective pieces of imaging data of the front camera 12Fr, the rear camera 12Rr, the left side camera 12L, and the right side camera 12R.

The display control unit 57 displays an obstacle icon indicating an obstacle position based on an input from the user of the vehicle 10 on the touch panel 42 in a superimposed manner on the external environment recognition image (the top view image and the three-dimensional image). The display control unit 57 superimposes an image of an obstacle icon of a predetermined virtual object viewed from a viewpoint of the top view image (hereinafter, also referred to as a top view obstacle icon) on the top view image, and superimposes an image of an obstacle icon of the predetermined virtual object viewed from a viewpoint of the three-dimensional image (hereinafter, also referred to as a three-dimensional obstacle icon) on the three-dimensional image for display. The top view obstacle icon and the three-dimensional obstacle icon are images indicating a position of the same obstacle in the periphery of the vehicle 10. The top view obstacle icon is an image of the virtual object viewed from above, and the three-dimensional obstacle icon is an image of the virtual object viewed from the side, the obliquely upper side, or the like. The image of the top view obstacle icon and the image of the three-dimensional obstacle icon are stored in the storage unit 54 as obstacle images created in advance. The obstacle image may be, for example, an image imitating a pylon. The top view obstacle icon is an example of a first obstacle icon in the present disclosure. The three-dimensional obstacle icon is an example of a second obstacle icon in the present disclosure.

The display control unit 57 switches, based on a predetermined input from the user, for example, an operation input from the touch panel 42 or an ON operation of a switch, display of the top view image and the three-dimensional image to be displayed on the touch panel 42. The display switching between the top view image and the three-dimensional image may be performed based on, for example, a movement speed of the vehicle 10 or a shift position of a gear. In accordance with the external environment recognition image that changes with movement of the vehicle 10, the display control unit 57 changes a superimposed position of the obstacle icon to be superimposed and displayed on the external environment recognition image.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 connected to the steering 110, thereby enabling assistance of an operation performed by the occupant on the steering 110 and enabling the automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with another communication device 120. The other communication device 120 is a base station, a communication device of another vehicle, an information terminal such as a smartphone carried by the occupant of the vehicle 10, or the like.

The driving force control system 26 includes a driving ECU 130. The driving force control system 26 executes driving force control of the vehicle 10. The driving ECU 130 controls a driving force of the vehicle 10 by controlling an engine (not shown) or the like based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a brake mechanism (not shown) or the like based on an operation performed by the user on the brake pedal (not shown).

<Display Control of External Environment Recognition Image Performed by Calculation Unit 52>

Next, an example of display control of an external environment recognition image performed by the calculation unit 52 will be described based on a flow chart shown in FIG. 4.

For example, it is assumed that a user who drives the vehicle 10 arrives near a parking lot and taps the automatic parking button (not shown) on the touch panel 42 in order to automatically park the vehicle 10. When the automatic parking button is tapped, external environment recognition images each representing the periphery of the vehicle 10 are displayed on the touch panel 42, and at that time, a selection screen is displayed on which it is possible to select whether to display the external environment recognition images as a top view image or as a three-dimensional image. When the user selects one of the external environment recognition images on the selection screen, the calculation unit 52 starts processing shown in FIG. 4.

First, the display control unit 57 of the calculation unit 52 acquires imaging data of the periphery of the vehicle 10 captured by the front camera 12Fr, the rear camera 12Rr, the left side camera 12L, and the right side camera 12R (step S11).

Next, the display control unit 57 determines whether to display the top view image as the external environment recognition image to be displayed on the touch panel 42, that is, whether the top view image is selected by the user on the selection screen (step S12).

In step S12, when the top view image is selected (step S12: Yes), the display control unit 57 generates a top view image of the periphery of the vehicle 10 based on the imaging data acquired by the front camera 12Fr, the rear camera 12Rr, the left side camera 12L, and the right side camera 12R (step S13).

Next, the display control unit 57 acquires the image of the top view obstacle icon, which is the obstacle icon for the top view image, from the storage unit 54 (step S14).

Next, the display control unit 57 superimposes the top view obstacle icon acquired in step S14 on a predetermined position designated based on an operation input from the user in the top view image generated in step S13 (step S15). As described above, the top view obstacle icon is an image indicating an obstacle position designated by the user, and is displayed as an image of a virtual object viewed from above.

Next, the display control unit 57 displays the top view image on which the top view obstacle icon is superimposed on the touch panel 42 (step S16). While the automatic parking is continued, the display control unit 57 returns to step S11 and repeats the processing. The display control unit 57 displays, on the touch panel 42, the top view image that changes in accordance with movement of the vehicle 10 in the automatic parking. The display control unit 57 changes a superimposed position of the top view obstacle icon in accordance with the change in the top view image caused by the movement of the vehicle 10.

On the other hand, in step S12, when the top view image is not selected (step S12: No), the display control unit 57 determines whether to display the three-dimensional image as the external environment recognition image to be displayed on the touch panel 42, that is, whether the three-dimensional image is selected by the user on the selection screen (step S17).

In step S17, when the three-dimensional image is not selected (step S17: No), the display control unit 57 returns to step S11 and repeats the processing.

In step S17, when the three-dimensional image is selected (step S17: Yes), the display control unit 57 generates a three-dimensional image of the periphery of the vehicle 10 based on the imaging data acquired by the front camera 12Fr, the rear camera 12Rr, the left side camera 12L, and the right side camera 12R (step S18). The display control unit 57 may change a direction of the generated three-dimensional image based on, for example, an operation of the user. The display control unit 57 may generate the three-dimensional image as an image viewed from the front, the rear, the right, the left, or the like of the vehicle 10.

Next, the display control unit 57 acquires the image of the three-dimensional obstacle icon, which is the obstacle icon for the three-dimensional image, from the storage unit 54 (step S19).

Next, the display control unit 57 superimposes the three-dimensional obstacle icon acquired in step S19 on a predetermined position designated based on an operation input from the user in the three-dimensional image generated in step S18 (step S20). As described above, the three-dimensional obstacle icon is an image indicating the obstacle position designated by the user, and is displayed as an image of the virtual object viewed from, for example, a side.

Next, the display control unit 57 displays the three-dimensional image on which the three-dimensional obstacle icon is superimposed on the touch panel 42 (step S21). While the automatic parking is continued, the display control unit 57 returns to step S11 and repeats the processing. The display control unit 57 displays, on the touch panel 42, the three-dimensional image that changes in accordance with the movement of the vehicle 10 in the automatic parking. The display control unit 57 changes a superimposed position of the three-dimensional obstacle icon in accordance with the change in the three-dimensional image caused by the movement of the vehicle 10.

A mode of the external environment recognition image to be displayed on the touch panel 42 can be switched between the top view image and the three-dimensional image by the operation of the user. When the user performs a switching operation for the external environment recognition image, the display control unit 57 determines whether the external environment recognition image selected by the switching operation is the top view image or the three-dimensional image in step S12 and step S17, and displays the determined external environment recognition image on the touch panel 42 according to the processing of each step.

<Obstacle Icon Displayed in External Environment Recognition Image>

Next, an obstacle icon displayed in an external environment recognition image (a top view image and a three-dimensional image) will be described with reference to FIGS. 5 and 6.

Figure 5:
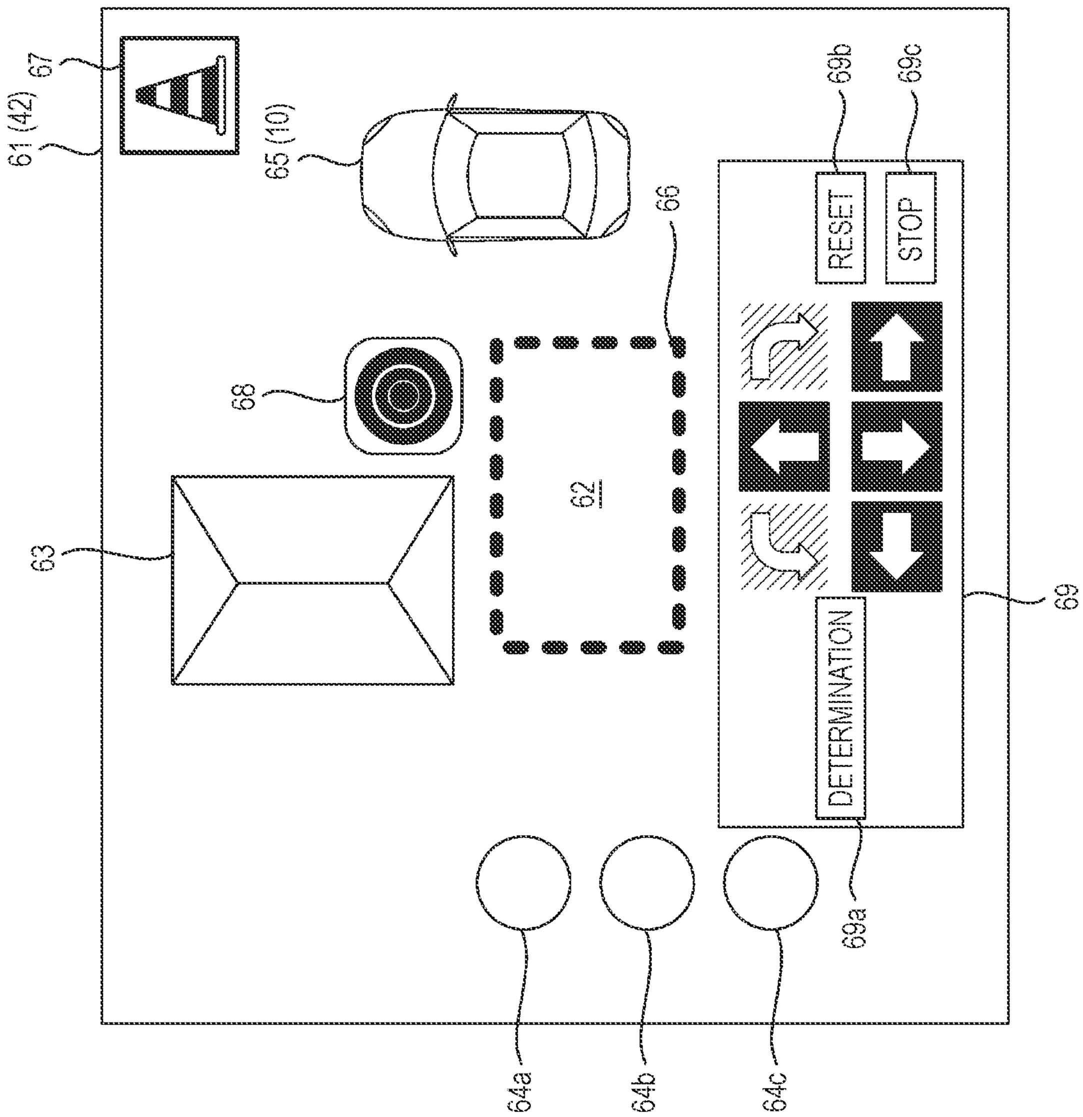
FIG. 5 is a view showing an example of a top view obstacle icon displayed in a top view image.

FIG. 5 is a view showing an example of a top view obstacle icon 68 displayed in a top view image 61. As shown in FIG. 5, the top view image 61 displayed on the touch panel 42 indicates an image of a situation in which a user automatically parks the vehicle 10 at a target parking position 66 of a home parking lot 62. The home parking lot 62 is provided between a house (a building) 63 of the user and a plurality of plants (obstacles) 64*a* to 64*c*. The vehicle displayed in the top view image 61 is an image showing a state in which the vehicle 10 is viewed from above, and is a vehicle image 65 generated (captured) in advance and stored in the storage unit 54 or the like.

In the top view image 61, the top view obstacle icon 68 can be disposed, by a screen operation of the user, at an obstacle position designated by the user. For example, the top view obstacle icon 68 can be disposed at any position by performing a swipe operation on an obstacle marker 67 displayed at an upper corner of the top view image 61. In the example shown in the drawing, the top view obstacle icon 68 is disposed in front of the building 63 close to the target parking position 66. The top view obstacle icon 68 is displayed as an image imitating a pylon. The top view obstacle icon 68 is displayed as an image of the pylon viewed from above. A plurality of top view obstacle icons 68 may be arranged.

In the top view image 61, an operation panel 69 is displayed by which a position of the disposed top view obstacle icon 68 can be moved. A cursor is displayed on the operation panel 69, and after the disposed top view obstacle icon 68 is touched and selected, the top view obstacle icon 68 can be moved in any arrow direction by the cursor of the operation panel 69. On the operation panel 69, a determination button 69*a* for determining the disposition of the top view obstacle icon 68, a reset button 69*b* for canceling the disposition of the top view obstacle icon 68, and a stop button 69*c* for stopping the disposition of the top view obstacle icon 68 are displayed. The top view image 61 is an image corresponding to the top view image displayed in the processing of step S16 in the display control shown in FIG. 4.

Figure 6:
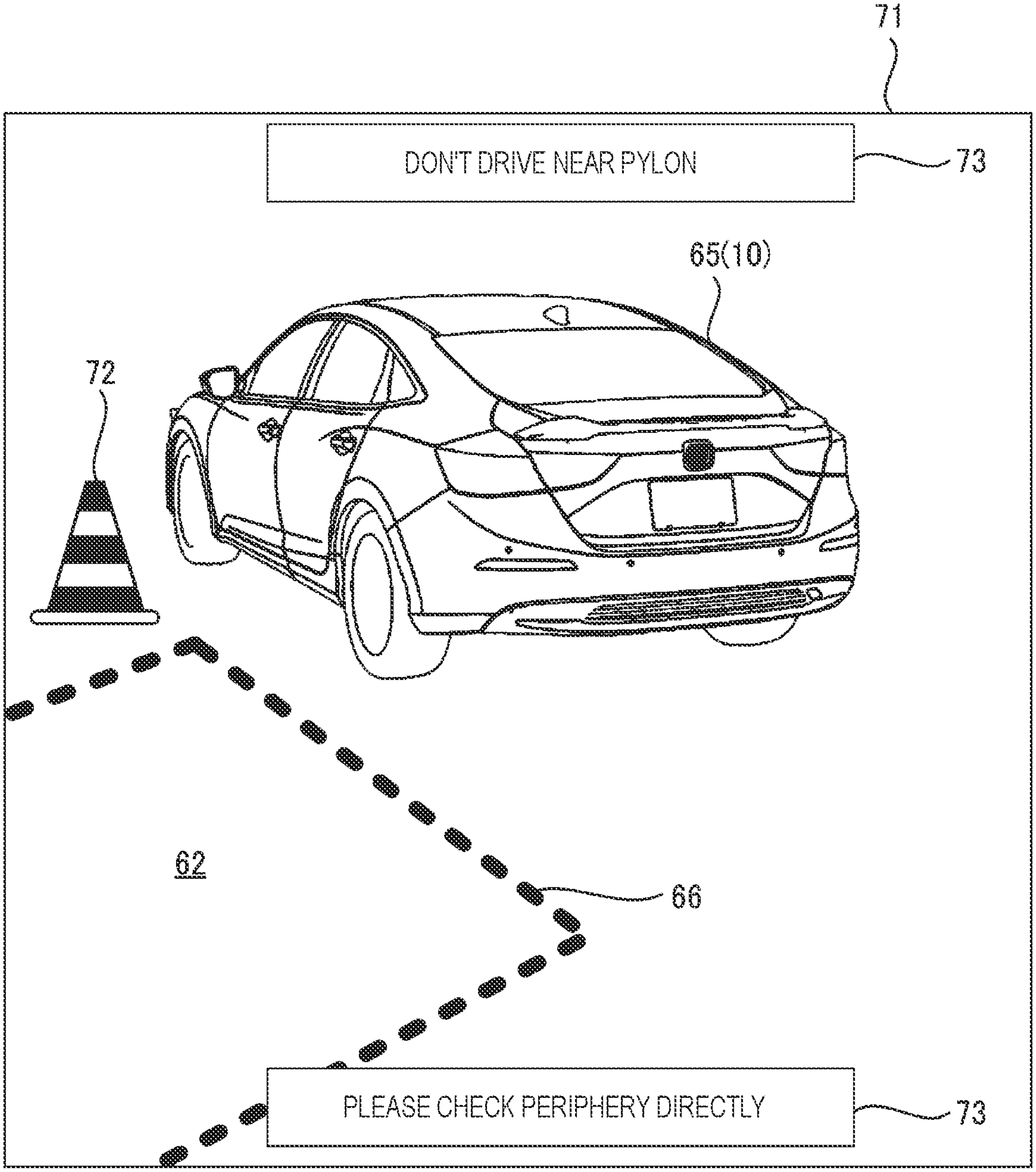
FIG. 6 is a view showing an example of a three-dimensional obstacle icon displayed in a three-dimensional image.

FIG. 6 is a view showing an example of a three-dimensional obstacle icon 72 displayed in a three-dimensional image 71. As shown in FIG. 6, the three-dimensional image 71 is a three-dimensional image of the periphery of the vehicle 10 shown in the top view image 61 in FIG. 5 viewed from a left rear side with respect to the vehicle 10. The three-dimensional obstacle icon 72 in the three-dimensional image 71 is displayed as an image of the pylon as viewed from a side. Similarly to the top view obstacle icon 68 shown in FIG. 5, the three-dimensional obstacle icon 72 is disposed in front of the building 63 close to the target parking position 66. In setting of an obstacle position (a position of the three-dimensional obstacle icon 72) in the three-dimensional image 71, for example, when the obstacle position (the position of the top view obstacle icon 68) in the top view image 61 is set by the designation of the user, the designated position in the top view image 61 is reflected. Also in the three-dimensional image 71, the obstacle marker 67 and the operation panel 69 may be displayed so that the disposition, movement, determination, and the like of the three-dimensional obstacle icon 72 can be performed. As in this example, a notification message 73 such as "DON'T DRIVE NEAR PYLON" or "PLEASE CHECK PERIPHERY DIRECTLY" may be displayed on the three-dimensional image 71. The three-dimensional image 71 is an image corresponding to the three-dimensional image displayed in the processing of step S21 in the display control shown in FIG. 4.

As described above, the display control unit 57 of the calculation unit 52 can cause the touch panel 42 to display, as the external environment recognition image, images having different viewpoints, for example, a top view image of the periphery of the vehicle 10 viewed from above and a three-dimensional image of the periphery of the vehicle 10 viewed from a side. The display control unit 57 superimposes the image of the top view obstacle icon in which the predetermined virtual object is viewed from the above on the top view image, and superimposes the image of the three-dimensional obstacle icon in which the predetermined virtual object is viewed from the side on the three-dimensional image, as obstacle icons indicating the same obstacle position designated based on the input from the user of the vehicle 10. Accordingly, the top view obstacle icon corresponding to the viewpoint of the top view image is displayed in the top view image, and the three-dimensional obstacle icon corresponding to the viewpoint of the three-dimensional image is displayed in the three-dimensional image, and thus a sense of incongruity of the obstacle icon displayed in each image can be prevented.

The display control unit 57 switches the display of the top view image and the three-dimensional image on the touch panel 42 based on, for example, an operation input to the touch panel 42 from the user. Accordingly, for each external environment recognition image selected by the user, an obstacle icon corresponding to a viewpoint of the external environment recognition image can be displayed, and the sense of incongruity of the obstacle icon displayed in each image can be prevented.

<Modification of Display Control of External Environment Recognition Image>

Figure 7:
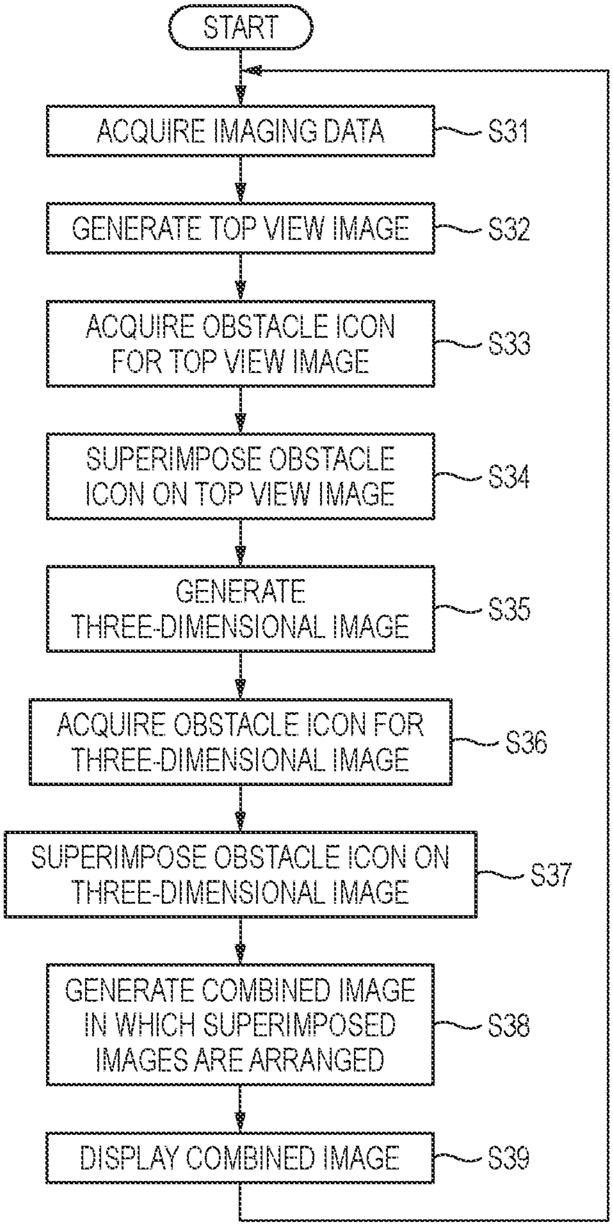
FIG. 7 is a flow chart showing a modification of the display control of the external environment recognition image.
Figure 8:
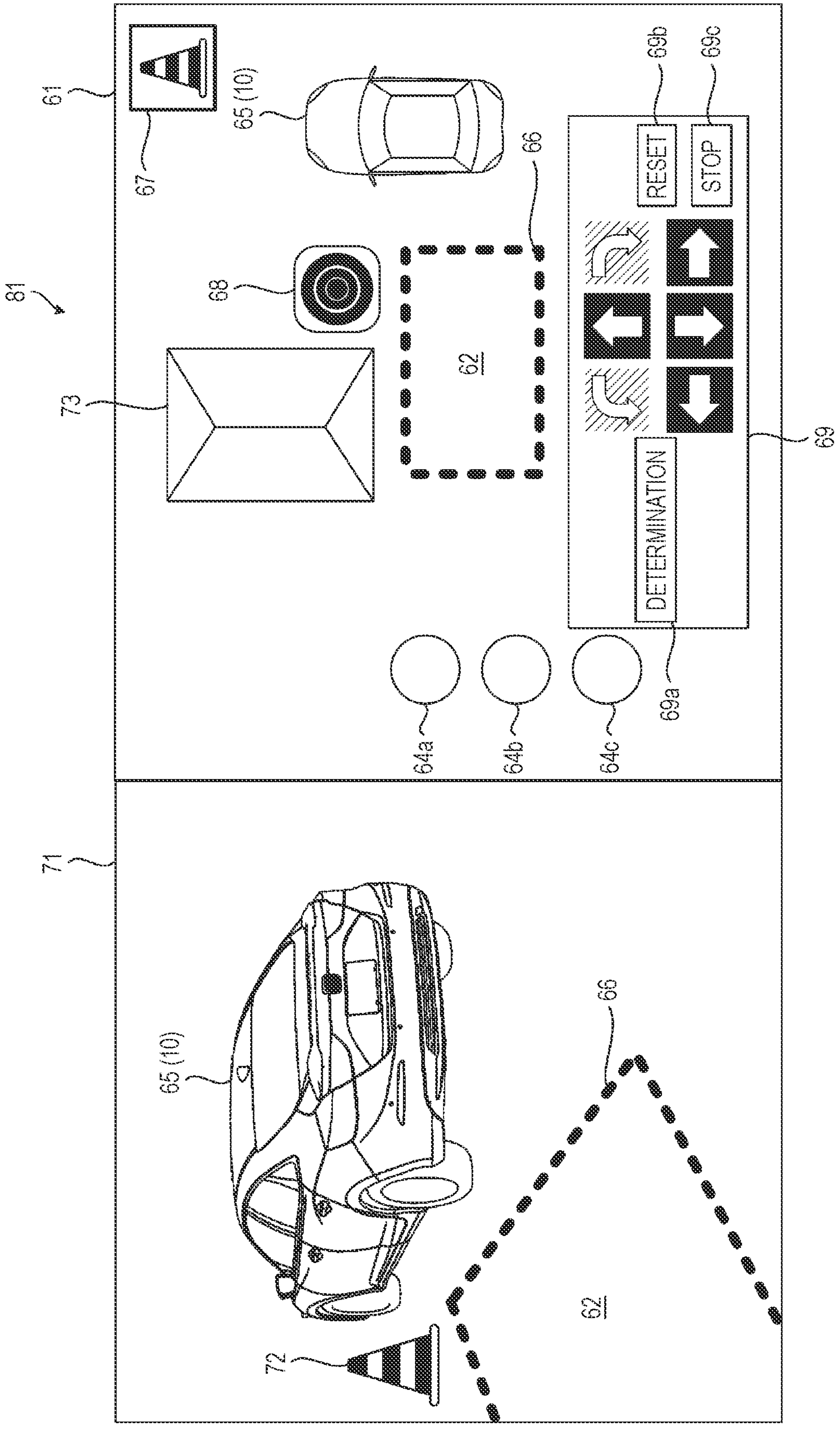
FIG. 8 is a view showing an example of a combined image including the top view image and the three-dimensional image.

Next, a modification of the display control of the external environment recognition image performed by the calculation unit 52 will be described with reference to FIGS. 7 and 8. FIG. 7 is a flow chart showing the modification of the display control of the external environment recognition image. FIG. 8 is a view showing an example of a combined image including the top view image and the three-dimensional image.

Figure 4:
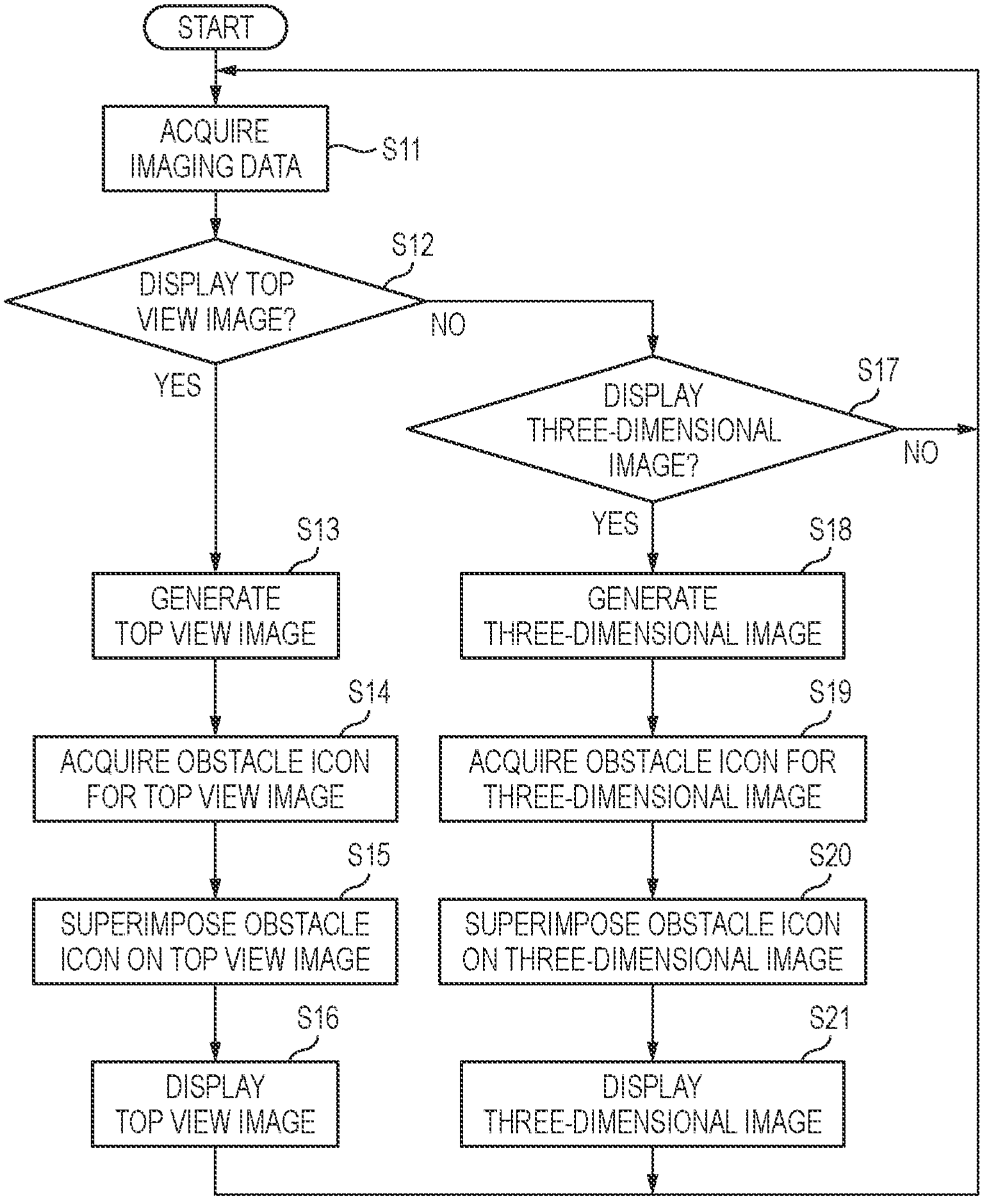
FIG. 4 is a flow chart showing an example of display control for an external environment recognition image.

As in the case of the processing in FIG. 4 described above, when the automatic parking button on the touch panel 42 is tapped and then an operation of selecting an external environment recognition image is performed, the calculation unit 52 starts processing shown in FIG. 7.

First, the display control unit 57 of the calculation unit 52 acquires imaging data of a periphery of the vehicle 10 captured by the front camera 12Fr, the rear camera 12Rr, the left side camera 12L, and the right side camera 12R (step S31).

Next, the display control unit 57 generates a top view image of the periphery of the vehicle 10 based on the imaging data acquired in step S31 (step S32). The top view image is, for example, the top view image 61 described with reference to FIG. 5.

Next, the display control unit 57 acquires a top view obstacle icon for a top view image in step S33, and superimposes the top view obstacle icon on the top view image in step S34. The processing contents are the same as those in steps S14 and S15 in FIG. 4.

Next, the display control unit 57 generates a three-dimensional image of the periphery of the vehicle 10 based on the imaging data acquired in step S31 (step S35). The three-dimensional image is, for example, the three-dimensional image 71 described with reference to FIG. 6.

Next, the display control unit 57 acquires a three-dimensional obstacle icon for a three-dimensional image in step S36, and superimposes the three-dimensional obstacle icon on the three-dimensional image in step S37. The processing contents are the same as those in steps S19 and S20 in FIG. 4.

Next, the display control unit 57 generates a combined image in which the top view image generated in step S34 on which the top view obstacle icon is superimposed and the three-dimensional image generated in step S37 on which the three-dimensional obstacle icon is superimposed are displayed side by side (step S38).

Next, the display control unit 57 displays the combined image generated in step S38 on the touch panel 42 (step S39).

For example, as shown in FIG. 8, the external environment recognition image in the modification is displayed on the touch panel 42 as a combined image 81 in which the top view image 61 and the three-dimensional image 71 are arranged in a horizontal direction. The top view image 61 is the top view image described with reference to FIG. 5, and superimposed with an image of a pylon viewed from above as the top view obstacle icon 68. The three-dimensional image 71 is the three-dimensional image described with reference to FIG. 6, and superimposed with a pylon viewed from a side as the three-dimensional obstacle icon 72.

While automatic parking is continued, the display control unit 57 returns to step S31 and repeats the processing. The display control unit 57 displays, on the touch panel 42, the combined image that includes the top view image and the three-dimensional image and that changes in accordance with movement of the vehicle 10 in the automatic parking.

The display control unit 57 changes a superimposed position of the top view obstacle icon and a superimposed position of the three-dimensional obstacle icon which are superimposed on the respective images, in accordance with the change in the top view image and the three-dimensional image caused by the movement of the vehicle 10.

As described above, the display control unit 57 of the calculation unit 52 in the modification can cause the touch panel 42 to display side by side, as the external environment recognition image, images having different viewpoints, for example, a top view image of the periphery of the vehicle 10 viewed from above and a three-dimensional image of the periphery of the vehicle 10 viewed from a side. The display control unit 57 superimposes an image of a top view obstacle icon in which a predetermined virtual object is viewed from above on the top view image, and superimposes an image of a three-dimensional obstacle icon in which the predetermined virtual object is viewed from a side on the three-dimensional image, as obstacle icons indicating the same obstacle position designated based on an input from a user of the vehicle 10. Accordingly, the obstacle icons (the top view obstacle icon and the three-dimensional obstacle icon) corresponding to viewpoints of the respective images are superimposed on the top view image and the three-dimensional image displayed side by side, and thus a sense of incongruity of the obstacle icon displayed in each image can be prevented.

<Modification of Automatic Parking Control Performed by Calculation Unit 52>

Figure 9:
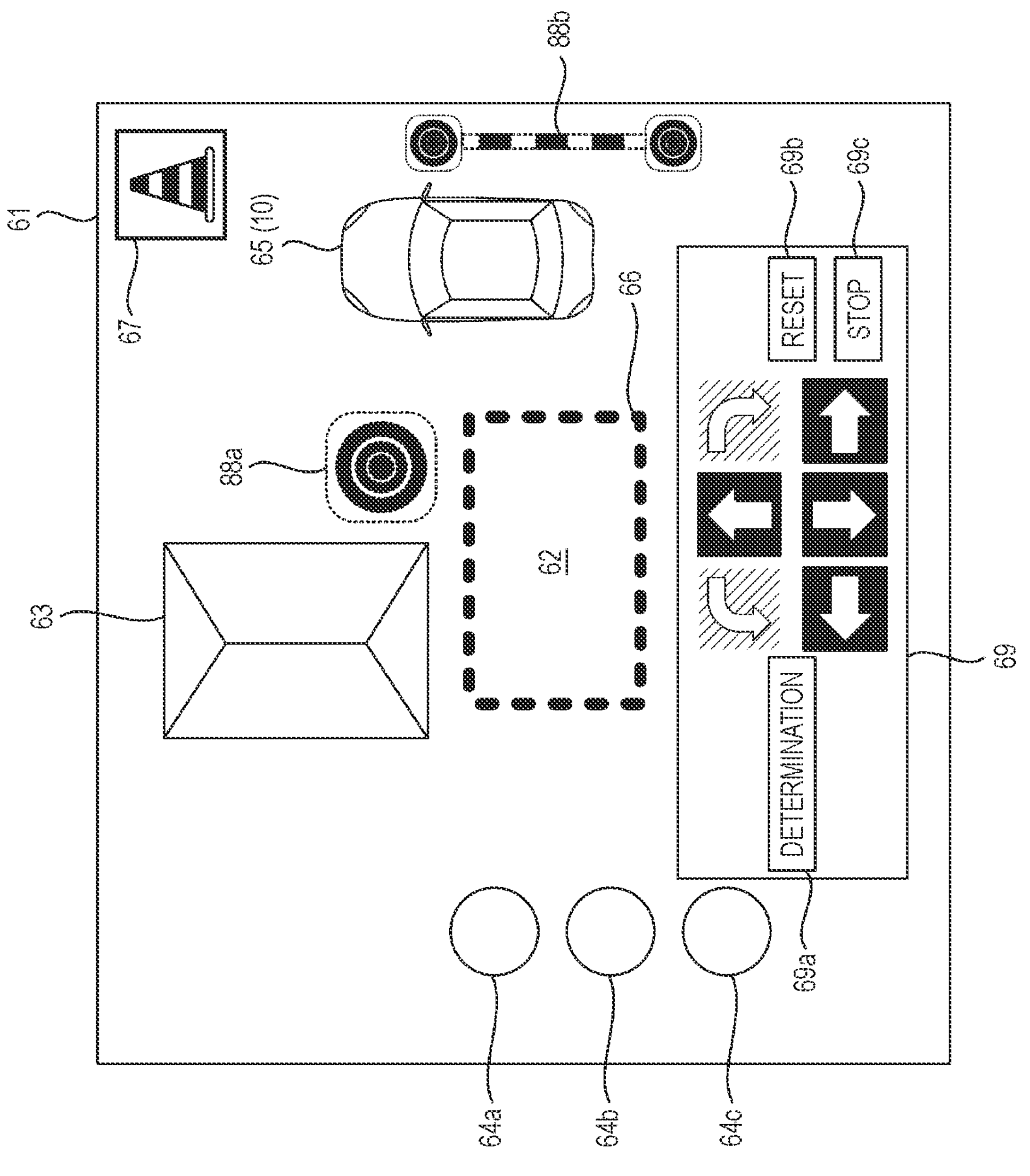
FIG. 9 is a view showing a modification of top view obstacle icons displayed in the top view image.

Next, a modification of the automatic parking control performed by the parking control unit 56 of the calculation unit 52 will be described with reference to FIG. 9. FIG. 9 is a view showing top view obstacle icons 88*a* and 88*b* displayed in the top view image 61.

In automatic parking control in the modification, as shown in FIG. 9, the parking control unit 56 displays in advance, on the top view image 61, the transparent top view obstacle icons 88*a* and 88*b* as candidates for an obstacle position, and performs a notification to the user. The candidates for the obstacle position refer to a position of an object that may be designated by the user as an obstacle, and refer to a position of an obstacle that is predicted and displayed by a parking control unit 56 side. Specifically, the parking control unit 56 predicts that the user may dispose a top view obstacle icon in front of the building 63 close to the target parking position 66, and displays the transparent top view obstacle icon 88*a* as a candidate. The parking control unit 56 predicts that the user may dispose the top view obstacle icon at a ground facing the target parking position 66, and displays the transparent bar-shaped top view obstacle icon 88*b* as a candidate.

When the displayed top view obstacle icon 88*a* or 88*b* is tapped by the user, the parking control unit 56 receives a position of the tapped top view obstacle icon as an obstacle position designated by the user. The parking control unit 56 changes a display state of the tapped top view obstacle icon from a transparent state to a non-transparent state for display. An operation method for moving the top view obstacle icon using the operation panel 69 displayed in the top view image 61 is the same as that described above. For example, the bar-shaped top view obstacle icon 88*b* shown in FIG. 9 can be rotationally moved with a curved arrow cursor of the operation panel 69.

As described above, the parking control unit 56 of the calculation unit 52 in the modification displays the candidates (the top view obstacle icons 88*a* and 88*b*) for the obstacle position on the touch panel 42 and performs the notification to the user, and receives the designation of the obstacle position selected by the user from the displayed candidates for the obstacle position. Accordingly, the obstacle position can be designated simply by tapping the top view obstacle icons 88*a* and 88*b* displayed as the candidates, a designation operation is made easy, and a burden at the time of setting the obstacle position can be reduced.

Although the embodiment of the present disclosure has been described above, the present disclosure is not limited to the above embodiment, and modifications, improvements, and the like can be made as appropriate.

For example, in the above embodiment, a case has been described where the top view image of the periphery of the vehicle 10 viewed from the above is displayed as the first external environment recognition image and the three-dimensional image of the periphery of the vehicle 10 viewed from the side is displayed as the second external environment recognition image, but the present disclosure is not limited thereto. For example, a three-dimensional image may be displayed as the first external environment recognition image, and a three-dimensional image having a viewpoint different from that of the three-dimensional image as the first external environment recognition image may be displayed as the second external environment recognition image. That is, three-dimensional images having different viewpoints may be switched and displayed on the touch panel 42, or may be displayed side by side.

In the above embodiment, the calculation unit 52 of the vehicle 10 has been described as the control device, but the present disclosure is not limited thereto. For example, the control device may be an information terminal such as a smartphone or a tablet terminal.

In the above embodiment, a case has been described where the display control unit 57 displays the top view image and the three-dimensional image on the touch panel 42 of the vehicle 10, but the present disclosure is not limited thereto. For example, the display control unit 57 may display the top view image and the three-dimensional image on a display screen of an information terminal (for example, a smartphone) carried by the occupant of the vehicle 10 via the communication unit 24.

The control method described in the above embodiment can be implemented by executing a control program prepared in advance on a computer. The control program is recorded in a computer-readable storage medium and is executed by being read from the storage medium. The control program may be provided in a form of being stored in a non-transitory storage medium such as a flash memory, or may be provided via a network such as the Internet. The computer that executes the control program may be provided in a control device, may be provided in an electronic device such as a smartphone, a tablet terminal, or a personal computer capable of communicating with the control device, or may be provided in a server device capable of communicating with the control device and the electronic device.

At least the following matters are described in the present specification. Although corresponding constituent elements and the like in the above embodiment are shown in parentheses, the present disclosure is not limited thereto.

(1) A control device (the calculation unit 52) for a moving body (the vehicle 10), the control device including:

an external environment recognition unit (the external environment recognition unit 55) configured to acquire an external environment recognition image representing a recognition result of a periphery of the moving body; and a display control unit (the display control unit 57) configured to cause a display device (the touch panel 42) to display an obstacle icon indicating an obstacle position based on an input from a user of the moving body in a superimposed manner on the external environment recognition image, in which the display control unit is configured to cause the display device to display a first external environment recognition image (the top view image 61) and a second external environment recognition image (the three-dimensional image 71) having different viewpoints as the external environment recognition image, and superimpose a first obstacle icon (the top view obstacle icon 68) on the first external environment recognition image and superimpose a second obstacle icon (the three-dimensional obstacle icon 72) different from the first obstacle icon on the second external environment recognition image as the obstacle icon.

According to (1), the obstacle icon corresponding to a viewpoint of the external environment recognition image is displayed, and thus a sense of incongruity of the obstacle icon can be prevented.

(2) The control device according to (1), in which the first obstacle icon is an image of a predetermined virtual object viewed from a viewpoint of the first external environment recognition image, the second obstacle icon is an image of the predetermined virtual object viewed from a viewpoint of the second external environment recognition image, and the first obstacle icon and the second obstacle icon are images indicating the same position in the periphery of the moving body.

According to (2), an image of the first obstacle icon and an image of the second obstacle icon when the predetermined virtual object is viewed from the viewpoints of the respective external environment recognition images are images indicating the same position, and thus the sense of incongruity of the obstacle icon can be prevented.

(3) The control device according to (2), in which the first external environment recognition image is a top view image of the periphery of the moving body viewed from above, the first obstacle icon is an image of the predetermined virtual object viewed from above, the second external environment recognition image is a three-dimensional image of the periphery of the moving body viewed from a side, and the second obstacle icon is an image of the virtual object viewed from a side.

According to (3), the obstacle icon in which the virtual object is viewed from the above is superimposed on the top view image of the periphery viewed from the above, and the obstacle icon in which the virtual object is viewed from the side is superimposed on the three-dimensional image of the periphery viewed from the side, and thus the sense of incongruity of the obstacle icon can be prevented.

(4) The control device according to any one of (1) to (3), in which the display control unit is configured to switch display of the first external environment recognition image and the second external environment recognition image based on a predetermined input from the user.

According to (4), for each external environment recognition image selected by the user, the obstacle icon corresponding to the viewpoint of the external environment recognition image can be displayed.

(5) The control device according to any one of (1) to (4), further including:

a parking control unit (the parking control unit 56) configured to perform parking control for parking the moving body at a target parking position based on the obstacle position.

According to (5), the parking control can be executed in consideration of the obstacle position at which the vehicle is not desired to pass.

(6) The control device according to (5), in which the parking control unit is configured to notify the user of candidates for the obstacle position, and receive designation of the obstacle position selected by the user from the candidates for the obstacle position.

According to (6), the user can select any obstacle position from obstacle positions displayed as the candidates, and thus a designation operation for the obstacle position is made easy, and a burden at the time of setting the obstacle position can be reduced.

(7) The control device according to any one of (1) to (6), in which the display control unit is configured to change a superimposed position of the obstacle icon in response to a change in the external environment recognition image caused by movement of the moving body.

According to (7), the superimposed position of the obstacle icon changes in accordance with the change in the external environment recognition image caused by the movement of the vehicle, and thus the sense of incongruity of the obstacle icon can be prevented.

(8) A control method executed by a control device for a moving body, including:

acquiring an external environment recognition image representing a recognition result of a periphery of the moving body;

causing a display device to display an obstacle icon indicating an obstacle position based on an input from a user of the moving body in a superimposed manner on the external environment recognition image;

causing the display device to display a first external environment recognition image and a second external environment recognition image having different viewpoints as the external environment recognition image; and superimposing a first obstacle icon on the first external environment recognition image and superimposing a second obstacle icon different from the first obstacle icon on the second external environment recognition image as the obstacle icon.

According to (8), the obstacle icon corresponding to a viewpoint of the external environment recognition image is displayed, and thus a sense of incongruity of the obstacle icon can be prevented.

(9) A non-transitory computer-readable recording medium storing a control program for causing a processor of a control device for a moving body to execute processing, the processing including:

acquiring an external environment recognition image representing a recognition result of a periphery of the moving body;

causing a display device to display an obstacle icon indicating an obstacle position based on an input from a user of the moving body in a superimposed manner on the external environment recognition image;

causing the display device to display a first external environment recognition image and a second external environment recognition image having different viewpoints as the external environment recognition image; and superimposing a first obstacle icon on the first external environment recognition image and superimposing a second obstacle icon different from the first obstacle icon on the second external environment recognition image as the obstacle icon.

According to (9), the obstacle icon corresponding to a viewpoint of the external environment recognition image is displayed, and thus a sense of incongruity of the obstacle icon can be prevented.

The invention claimed is:

1. A control device for a moving body, the control device comprising circuitry configured to:

acquire an external environment recognition image representing a recognition result of a periphery of the moving body; and cause a display device to display an obstacle icon indicating an obstacle position based on an input from a user of the moving body in a superimposed manner on the external environment recognition image, wherein the circuitry is configured to:

cause the display device to display a first external environment recognition image and a second external environment recognition image having different viewpoints as the external environment recognition image; and superimpose a first obstacle icon on the first external environment recognition image and superimpose a second obstacle icon different from the first obstacle icon on the second external environment recognition image, as the obstacle icon, and one of the first external environment recognition image or the second external environment recognition image is a virtually created view of an exterior of the moving body viewed from a side of the moving body.

2. The control device according to claim 1, wherein the first obstacle icon is an image of a predetermined virtual object viewed from a viewpoint of the first external environment recognition image, the second obstacle icon is an image of the predetermined virtual object viewed from a viewpoint of the second external environment recognition image, and the first obstacle icon and the second obstacle icon are images indicating a same position in the periphery of the moving body.

3. The control device according to claim 2, wherein the first external environment recognition image is a top view image of the periphery of the moving body viewed from above, the first obstacle icon is an image of the predetermined virtual object viewed from above, the second external environment recognition image is a three-dimensional image of the periphery of the moving body viewed from a side, and the second obstacle icon is an image of the predetermined virtual object viewed from a side.

4. The control device according to claim 1, wherein the circuitry is configured to switch display of the first external environment recognition image and the second external environment recognition image based on a predetermined input from the user.

5. The control device according to claim 1, wherein the circuitry is further configured to:

perform parking control for parking the moving body at a target parking position based on the obstacle position.

6. The control device according to claim 5, wherein the circuitry is configured to notify the user of candidates for the obstacle position, and receive designation of the obstacle position selected by the user from the candidates for the obstacle position.

7. The control device according to claim 1, wherein the circuitry is configured to change a superimposed position of the obstacle icon in response to a change in the external environment recognition image caused by movement of the moving body.

8. A control method executed by a control device for a moving body, the control method comprising:

acquiring an external environment recognition image representing a recognition result of a periphery of the moving body;

causing a display device to display an obstacle icon indicating an obstacle position based on an input from a user of the moving body in a superimposed manner on the external environment recognition image;

causing the display device to display a first external environment recognition image and a second external environment recognition image having different viewpoints as the external environment recognition image; and superimposing a first obstacle icon on the first external environment recognition image and superimposing a second obstacle icon different from the first obstacle icon on the second external environment recognition image as the obstacle icon, wherein one of the first external environment recognition image or the second external environment recognition image is a virtually created view of an exterior of the moving body viewed from a side of the moving body.

9. A non-transitory computer-readable recording medium storing a control program for causing a processor of a control device for a moving body to execute processing, the processing comprising:

acquiring an external environment recognition image representing a recognition result of a periphery of the moving body;

causing a display device to display an obstacle icon indicating an] obstacle position based on an input from a user of the moving body in a superimposed manner on the external environment recognition image;

causing the display device to display a first external environment recognition image and a second external environment recognition image having different viewpoints as the external environment recognition image; and superimposing a first obstacle icon on the first external environment recognition image and superimposing a second obstacle icon different from the first obstacle icon on the second external environment recognition image as the obstacle icon, wherein one of the first external environment recognition image or the second external environment recognition image is a virtually created view of an exterior of the moving body viewed from a side of the moving body.

* * * * *